United States Patent [19]
Bratten

[11] 3,913,534
[45] Oct. 21, 1975

[54] ROTARY ENGINE
[76] Inventor: Winfred A. Bratten, Brady, Nebr. 69123
[22] Filed: Mar. 1, 1974
[21] Appl. No.: 447,348

[52] U.S. Cl. .............. 123/8.49; 60/597; 123/8.05; 123/8.15; 123/8.43
[51] Int. Cl.² ................... F02B 53/06; F02B 53/08
[58] Field of Search ........... 60/597; 123/8.05, 8.43, 123/8.49; 418/244

[56] References Cited
UNITED STATES PATENTS

| | | | |
|---|---|---|---|
| 1,277,735 | 9/1918 | LaPorte | 60/597 |
| 1,338,039 | 4/1920 | Porter | 123/8.49 |
| 1,655,738 | 1/1928 | Rasck | 418/244 X |
| 3,306,269 | 2/1967 | Dimmock | 123/8.49 |

FOREIGN PATENTS OR APPLICATIONS

| | | | |
|---|---|---|---|
| 711,040 | 6/1931 | France | 123/8.43 |
| 377,877 | 8/1932 | United Kingdom | 123/8.49 |
| 20,203 | 10/1899 | Switzerland | 123/8.49 |

*Primary Examiner*—C. J. Husar
*Assistant Examiner*—Michael Koczo, Jr.

[57] ABSTRACT

A rotary engine having recesses in a cylindrical rotor cavity receiving movable valves which are pressed into the recesses by protrusions on a power rotor assembly for compressing gases, and said valves moving toward a rotor axis to allow combustion force to reach the rotor cavity from the recesses and to contain combustion forces, the power rotor assembly having cooling air opening means therethrough, fan blades on the rotor assembly moving air through its said opening means, an air timing valve assembly connected to the power rotor by a driveshaft and valving air flow passages, the air flow passages extending through the housing to the recesses.

20 Claims, 7 Drawing Figures

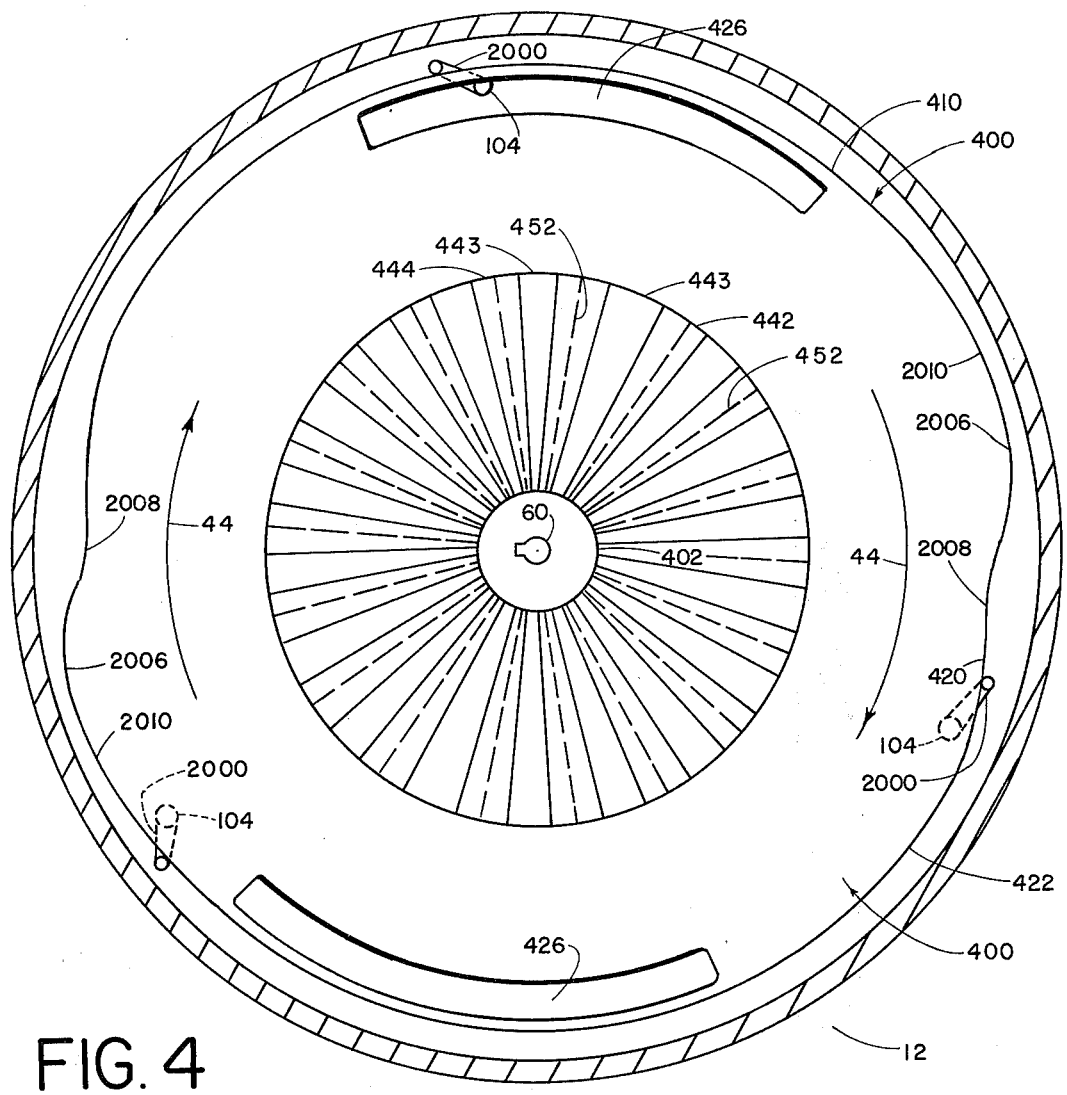
FIG. 4
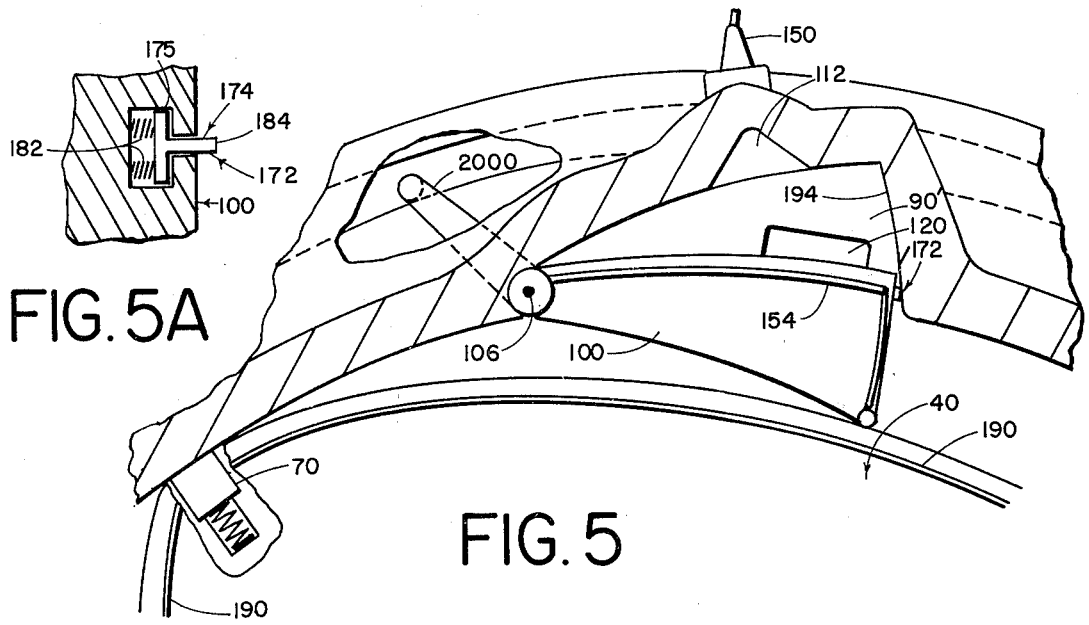
FIG. 5A
FIG. 5

ROTARY ENGINE

FIELD OF THE INVENTION

This invention is in the field of rotary combustion engines of all suitable uses, sizes and fuels. Automotive use is a field of particular application.

DESCRIPTION OF THE PRIOR ART

In the prior art there is no rotary engine having recesses in a cylindrical rotor cavity receiving movable valves which are pressed into the reecesses by protrusions on a power rotor assembly for compressing gases, and the valves moving toward a rotor axis to allow combustion force to reach the rotor cavity from the recesses and to contain combustion forces, the power rotor assembly having coolair opening means therethrough, fan blades on the rotor assembly moving air through its aid opening means, an air timing valve assembly connected to the power rotor by a drive shaft and valving air flow passages, the air flow passages extending through the housing to the recesses.

An objective is to provide the further conccepts of the rotor fan being mounted in the rotor to make the engine compact and having the cooling air pass through the power rotor in a direction such that it comes to the power rotor first from the coolest side of the air stream.

A very important object is to provide an engine in which during combustion, the explosive force is exerted partly against power valves attached to the housing instead of being exerted entirely against relatively smooth surfaces of a rotor and housing.

Still a further object is to provide a rotor assembly so shaped that portions thereof, which protrude outwardly the farthest, present steep surfaces facing rearwardly with regard to the direction of rotation so as to be facing the origin of incoming combustion gases.

A particular object is to provide an engine in which the rearward thrust of the explosion is very well contained by housing surfaces and valve surfaces of power valves fixed to the housing so as to direct the power force at protruding portions of the rotor with a maximum of thrust.

A particular object is to provide an air input timing rotating valve assembly fixed to the rotor which causes a selected amount of air to be delivered to a combustion chamber for the purposes of combustion, specifically, the amount of air needed for combustion, and also other air for cooling.

A French patent was issued in 1931 to Mr. Salamon, French Pat. No. 411,040, which has valves at rotor combustion recesses, but it is a different feature of this invention that the valves of my engine are forced by the rotor outwardly into recesses in a manner for substantially compressing fuel and air mixture, not just sufficiently to barely close the recesses.

SUMMARY OF THE INVENTION

A rotary engine having recesses in a cylindrical rotor cavity receiving movable valves which are pressed into the recesses by protrusions on a power rotor assembly for compressing gases, and said valves moving toward a rotor axis to allow combustion force to reach the rotor cavity from the recesses, the power rotor assembly having cooling air opening means therethrough, fan blades on the rotor assembly in positions for delivering air through said opening means in a direction along said axis, the housing having air flow passages extending therethrough to the recesses, an air timing valve assembly connected to the power rotor by a drive shaft and valving air flow through said passages, means for delivering fuel to said recesses, a first down stream air blower on the down stream side of said power rotor air opening means, said air timing valve assembly and said first down stream air blower being connected together and in combination defining a first down stream rotating assembly, a second down stream rotating assembly comprising blower blades mounted for rotation with said drive shaft and receiving air from said first blower and delivering air into said air passages, an exhaust blower mounted on said drive shaft outside of said housing, exhaust conduit means leading from exhaust openings on the power rotor cavity side wall to said exhaust blower, and cooling air fan blades, means mounting the cooling air fan blades for rotation with said drive shaft, and a cooling air cowling directing cooling air coming from said cooling air fan blades across a substantial portion of the exterior of said housing.

BRIEF DESCRIPTION OF THE DRAWING

FIG. 4 is a sectional view taken along the line 4—4 of FIG. 2.

FIG. 5 is a detail showing a modification, the view in FIG. 5 otherwise corresponding to the upper portion of FIG. 1, but with an outer edge of a first rotating assembly shown in its recess in a portion of the outer housing of the engine, FIG. 5 being a modification of the engine of FIG. 2 in which the first rotating assembly, and the housing portion receiving it, extend farther outward at the sides of the engine than they do in FIG. 2.

FIG. 5A is a detail showing an end seal of a valve of FIG. 5, but with a closer portion of a valve receiving it broken away.

DESCRIPTION OF THE PREFERRED EMBODIMENT

Figure 1:
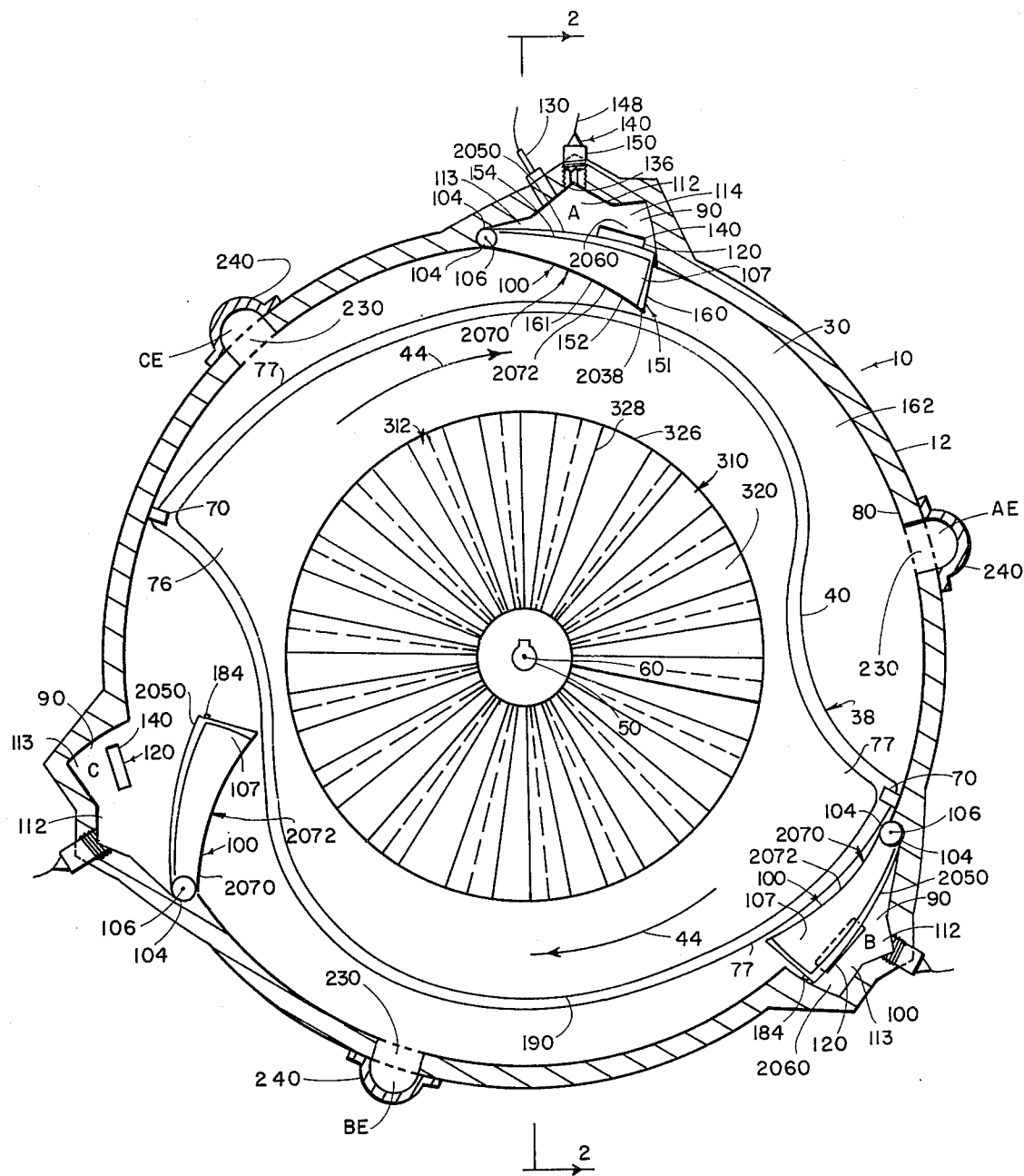
FIG. 1 is approximately similar to a sectional view taken along the line 1—1 of FIG. 2 of the engine of this invention, but FIG. 1 is a modification thereof not showing the FIG. 2 feature of the engine housing as outwardly extended so as to receive a first rotating assembly having a camming outer surface to control valve opening levers.

The rotary engine of this invention is generally indicated in FIG. 1 at 10 and has an outer housing 12 surrounding a rotor cavity 30. the cavity 30 has in it a power rotor assembly 38 having a power rotor 40 rotating in the direction of arrows 44 about a driveshaft 50, having a horizontal axis 60.

The rotor has two rotor side wall sealing assemblies 70 disposed on opposite sides of the axis 60 and adapted to make a tight, sliding fit with the side wall 80 of the cavity 30.

The rotor sidewall sealing assemblies 70 are mounted in the outermost portions of two rotor protrusions 76.

Each rotor protrusion 76 and its rotor side wall sealing assembly 70 define a rotor protrusion assembly 77.

The cavity side wall surface 80 is substantially cylindrical except for various recesses in it, which will be later described.

Such recesses comprise a plurality of power valve recesses which are three in number and are located equidistantly spaced around the axis 60 and extend a substantial distance beyond and away from the axis 60 from the cylindrical configuration in which the side wall 80 lies.

The recesses 90 are for receiving respective ones of three power valves 100 having ends which pivot on hinge pins suitably mounted on the housing 80, each hinge pin 104 having a valve hinging axis 106 parallel to the axis 60. The valve axes 106 are each on a rearward side of the respective valve 100 with respect to the direction of rotation 44 of the rotor.

The recesses 90 are adequate to completely receive the respective valves 100 so that the valves can move into the recesses 90 so as not to extend toward the rotor axis 60 beyond the cylindrical configuration of the side wall 80.

The recesses 90 each have an air inlet port in a sidewall 114 thereof to allow air under pressure to pass therethrough against those sides of the valves 100 to press are opposite the axis 60 to cause the valves 100 to press toward the axis 60 so as to ride on and press against the exterior of the rotor 40.

Air under pressure from a source later to be described comes to the air inlet ports 120. As seen in FIG. 1, the air inlet ports 120 are adjacent to the free ends of the respective power valves 100.

Firing chambers 112 are sub-recesses disposed one in the inner wall of each of the valve recesses 90.

The remainder of the volume of the recesses 90 which are beyond the firing chamber sub-recesses 112, can be called compression chambers 113 because, as seen in FIG. 1, the valves 100 sweep across and push out into the firing chambers 113 substantially all fuel and air mixture which is in the compression chambers 113.

It is in the firing chambers 112 that fuel is first ignited from an ignition initiator or plug 130, which can be a glow plug, as shown, or it can be a spark plug. It is also possible to leave the plug 130 without connection to anything electrical or simply absent so as to use the same engine with its only ignition being the pressure of the fuel and air mixture itself, as in many diesel engines.

Fuel and air can both enter each power valve recess 90 through the air port 120 thereof by means of inserting gas inlet and carburetor type venturi means in the elongated air passage portions 646. But the system shown has fuel-air port means generally indicated at 140, which is formed actually of two separate ports, a first port for air at 120, and a second or fuel port 136 for fuel, such as diesel fuel, gasoline, or other combustible fuel, being passed through a pipe 148 to a fuel inlet fitting 150 which communicates to the firing chamber 112 through its outlet, which latter is the fuel port 136.

As seen in FIG. 1, each valve 100 is provided with a set 151 of side wall sealing assemblies on its right and left side walls 152, such side wall sealing assemblies comprising two first sealing assemblies 154 extending along the sides 152 of the valve 100, and near that edge thereof which faces away from the axis 60.

Second sealing assemblies 160 on the two sides 152 of each valve 100 are also called end sealing assemblies 160 and press outwardly away from each valve 100 against respective end walls 162 of the housing 12 on the right and left sides of the respective valve 100 and disposed on those edges of those respective right and left sides which are disposed at the opposite ends of the valves 100 from their hinge axes 106.

Referring to FIG. 5A, a detail of a valve 100 is shown in which a very important end sealing assembly 172 is shown on that free end of the valve 100 which is farthest from the valve axis 106. The end sealing assembly 172 has an end seal 174 which is T-shaped in cross-section having a transverse portion 175 extending substantially along a radius from the axis 60, and with its main portion 184 extending substantially at a tangent to a cylindrical configuration therethrough centered on the axis 60 of the rotor, whereby the portion 184 presses slidably against a curved wall 194 of the power valve recess 90, the curved wall 194 being arranged on a segment of a cylinder centered about the hinge axis 106.

In FIGS. 1 and 5, it will be seen that the rotor 40 has suitable end wall seals 190, each extending from one sidewall seal 70 to the next and each being disposed on a respective end of the rotor 40, whereby the seals 190 press outwardly from the rotor against respective end walls 162 of the housing 12, the end walls 162 being disposed in planes each at a right angle to the rotor axis 60.

The end wall seals 190, and the sidewall seals 70 can all be made in any suitable way, for example, in the way the power valve end sealing assembly is formed, as seen in FIG. 5A.

The axis 60 sides of the power valves 100 are shown at 161 to be arcuate so that the ends of the sides 161 which are farthest from the hinge pin 104 are always in engagement with the rotor assembly 40, but the remainder of each of the sides 161 is never in engagement with the rotor assembly.

Referring again to FIG. 1, exhaust ports 230 are shown at three places extending through the housing 12 at points located substantially more than half way forwardly with respect to the rotational direction of the rotor from each respective power valve recess 90 to the next recess 90, so that the exhaust gases are delivered out each respective exhaust port 230 to an exhaust conduit 240.

Figure 2:
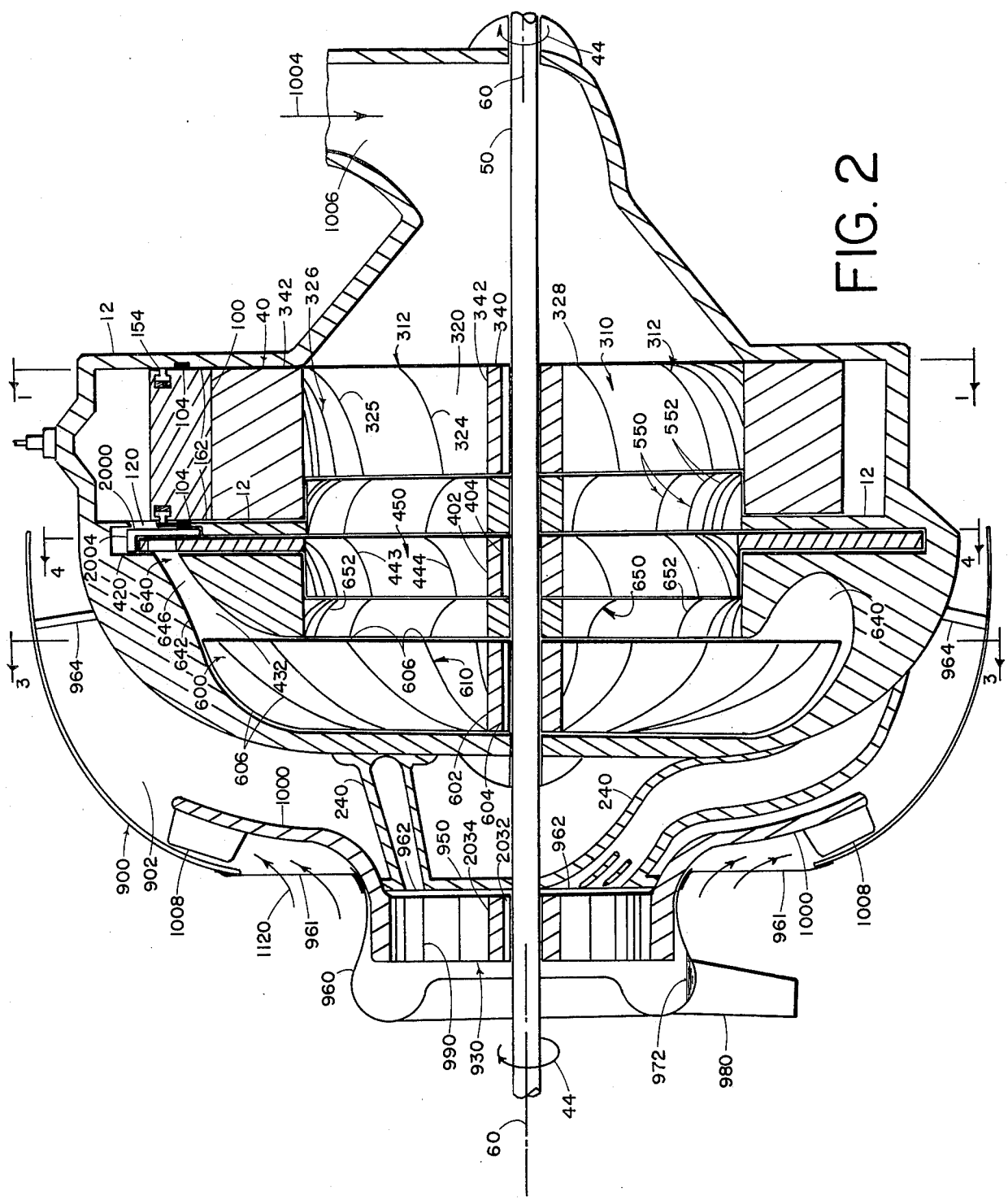
FIG. 2 is a sectional view taken along the line 2—2 of FIG. 1 and shows the engine with a closer one-half portion broken away and the remainder showing in section except for the crankshaft.

Referring to FIG. 2, the rotor 40 will be seen to have an air channel 310 extending therethrough having a first turbo-fan 312 in it. The air channel 310 is formed by a plurality of air passage openings 320 therethrough each bounded on two sides by fan blades 324 and 325, since each one of alternate fan blades are numbered 324 and the inbetween alternate fan blades are numbered 325. This numbering is useful in FIG. 1 beccause it makes it possible to show that the downstream edge of each fan blade 324 or 325 is shown in dotted lines in FIG. 1, since it is obscured by the forward edge 328 of an adjacent fan blade 324 or 325. The fan blades 324 and 325 together comprise the first turbo-fan 312.

The rotor 40 has a hub 340 and an outer solid portion 342 and these two are interconnected by the blades 324 and 326 themselves. The blades 324 and 326 are parallel and are each inclined with respect to the engine axis 60.

In FIG. 2, a first downstream rotating assembly which is used for timing is generally shown at 400 and has a hub 402 keyed to the drive shaft 50 by a key 404 just as the hub 340 is keyed by a key 342 to the shaft 50.

The first ddownstream rotating assembly 400 is seen also in FIG. 4 and can be seen to have a substantially solid outer valving portion 410 disposed farthest from the axis 60 and which fits, closely and slidably, the side walls of a circular first downstream rotating assembly receiving recess 420 on the inner side of the housing 12, the circular recess 420 being centered on the axis 60 closely receiving the substantially circular outer edge 422 of the valving portion 410.

FIG. 4 is taken along the line 4—4 of FIG. 2, whereby the recess 420 is shown in dotted lines in FIG. 4.

The substantially solid outer valving portion 410 is provided with two air-input timing valve openings 426, hence the first downstream rotating assembly 400 serves as a timing valve.

The timing valve openings 426 are each elongated and curved and in the form of a segment of an arc of a circle centered on the axis 60, and are disposed to register with the air passages 432 in the housing 12, leading to openings 120 respectively, which latter are seen in FIGS. 1 and 2.

It is important that the openings 426 be much longer along a circle centered on the axis 60 than the air openings 120 so as to permit air to flow therethrough during a rotating period involving a segment of a complete rotation of the axle 50.

The power valves 100 may stick shut without special prevention means and to provide prevention, a power valve opening lever assembly 2000 is provided, as best seen in FIG. 2.

The lever assemblies 2000 are each attached to the respective hinge pin 104 which is fixed to the respective valve 100. So the levers 2000 rotate with and control rotation of the valves 100 about the respective hing pin center line 106. The lever assemblies 2000 can be seen in FIG. 2 to each have a transverse portion 2004 engaging the outer edge of the first downstream rotating assembly 400, which latter has two outwardly extending cam portions that will press on the portions 2004, seen in FIG. 4, for causing the lever assemblies 2000 to force the power valves 100 to open surely. This is important because a valve that is stuck shut will also close off its intake opening 120 so that air will not force it open either.

The center portion of the first downstream rotating assembly 400 is the hub 402, earlier described, but outwardly of the hub 402, and between that and the outer substantially closed valving portion 410 is a bladed section generally indicated at 442, which latter has a plurality of blades 443 and 444. The blades 443 are alternate blades of one set and the blades 444 are those alternate blades of a second set that are between each closest pair of blades 443. The downstream edge of each of the blades 443 and 444 of the assembly 400 are seen in dotted lines at 452 in FIG. 4.

The blades 443 and 444 define a second turbo-fan 450, which forms the first downstream rotating assembly 400 are each radially extending and spaced apart and generally of the same type and description and arrangement as the blades of the main rotor 40 and are of the same length but they are not of the same width taken parallel to the axis 50 since the entire assembly 400 is of a lesser width than the main rotor 40.

The first downstream rotating assembly 400 is spaced from the main rotor 40 and inbetween the two are a plurality of blades 552 of a stator blade assembly 550, each spaced from the others and each generally radially extending from attachment to a hub 552' which rotatably receives drive shaft 50. Outer ends of the blades 552 are attached to the engine housing 12.

Figure 3:
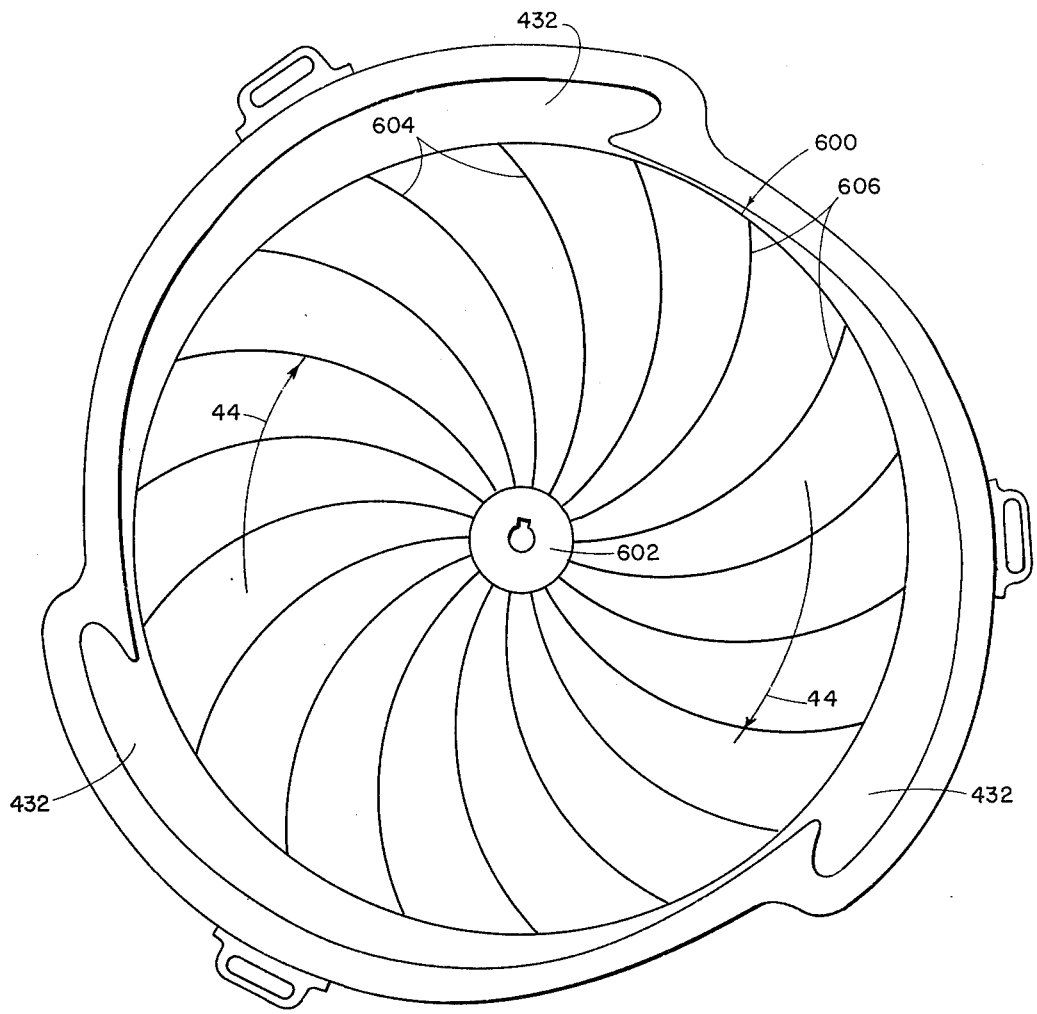
FIG. 3 is a sectional view taken along the line 3—3 of FIG. 2.

The motor has a second downstream rotating assembly generally indicated at 600 which has a hub 602 attached by a key 604 to the axle 50 and the assembly 600 further seen in FIG. 3, which is taken along the line 3—3 of FIG. 2.

The second downstream assembly 600 is almost entirely fan blades 606 of a centrifugal turbo-fan generally indicated at 610, with a very minor portion of its bulk being formed of the hub 602, all as seen in FIG. 3.

Figure 6:
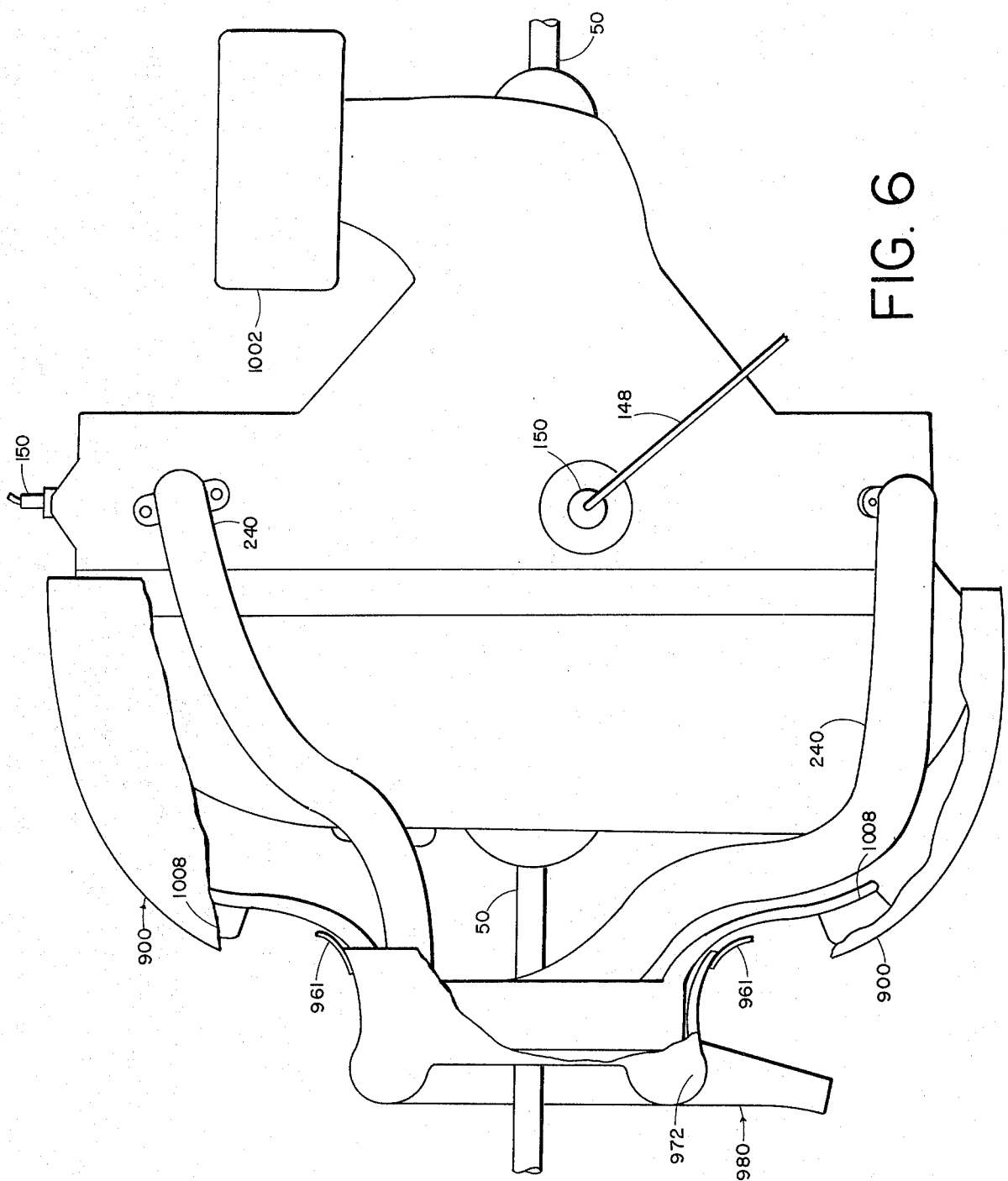
FIG. 6 is a side elevation of the engine of FIG. 2, but with portions of a cooling air cowling and portions of a rear blower wall broken away.

The blades 606 of the second downstream assembly 600 are understood to be quite different from the blades of the main assembly 400 inasmuch as they do not extend radially in the first place, but have a curvature, as seen in FIG. 3, causing their leading edges 606, seen in FIG. 6, to be arcuate andd curving rearwardly with respect to the direction of rotation indicated by the arrows 44 as the outer ends of the blades 606 are approached.

In other words, those sides of the blades 606 which face in the direction of rotation are convex and the other sides thereof are concave, all to direct airflow to the periphery of the assembly 600.

The throwing of the air outward away from the axis 50 by the assembly 600 will cause the air to be directed back toward the rotor assembly 40 because of the shape of the outer wall 642 of a centrifugal turbo-fan cavity 640 which receives the centrifugal turbo-fan generally indicated at 610, the cavity 640 having its outer wall 642 so shaped as to define three air passages 432, which latter each extend somewhat less than one-third of the way around the rotor side of the assembly 600, but the air passages 432 are particularly provided with elongated portions 646, each of which extends to one of the air inlet ports 120 at three equidistantly spaced points, as earlier described.

However, it will be seen that air cannot pass from the passage portions 646 through the air inlet ports 120 except at times when there is registry between a port 120 and one of the openings 426 in the first downstream assembly 400.

A second set of stator blades is generally indicated at 650 and having many blades 652 fixed to the housing 12 and is disposed between and second turbo-fan 450 and the centrifugal turbo-fan 61. The blades 652 of the second set of stator blades 650 are positioned so as to serve the same function as regards air flowing from the second turbo-fan 450 that the blades of the first set of stator blades 550 serve with respect to the first turbo-fan 310. In other words, the blades 652 tend to cause the flow of air from the second turbo fan 450 to flow in a direction more in alignment with the axis 60 than the air would tend to do as a result of the action of the second turbo-fan 450 whereby some of the tendency of the air to swirl around the axis 60 is corrected by the second set of stator blades 650.

Referring to FIG. 1, it can be seen that a new feature of this engine is that the same valves which form a back-up for the combustion force also serve to shut off and open the air intake ports 120, which is a feature of the engine.

In operation, referring to FIG. 1, with the parts in the position shown, air is entering the upper port 120 into a first vaalve recess A, but cannot leave the recess A because the power valve 100 of that recess A is in the way. Simultaneously, at the firing chamber B at the timing of the poisitions in FIG. 1, the air intake port 120 at B is not closed by the valve 100 at B, but, however, air cannot enter because the port 120 at B is at that time closed by closed portions of the timing first rotating assembly 400 of FIG. 4, since the openings 426 of the assembly 400 are neither one opposite the passage 646 of FIG. 2 and air cannot reach the opening 120 at B, as shown in FIG. 1.

No compression at the chamber B in FIG. 1 will occur when the adjacent rotor seal 70 has passed the innermost tip of the respective valve 100 as shown in FIG. 1. The maximum compression at B is when the B valve 100 later moves completely into its recess leaving the gases compressed entirely into the tight firing chamber 112 at B. It is to be understood, however, that one can have as much compression as desired by designing as one chooses the volume of the firing chambers 112.

A later described cooling air cowling is shown in FIG. 2 at 900 and is spaced from the rotor housing 12 so that air flowing between the two can cool the outer side of the housing 12.

Air is directed under the cowling in the space 902 between the cowling 900 and the rotor housing 12 by means of a blower 930. Referring to FIG. 6, the exhaust conduits 240 lead to a wall 950 and through the wall 950. The wall 950 is a wall supported by the conduits 240.

An exhaust blower 930 is fixed to the drive shaft 50 and has a stationary rear blower wall 960 attached to the engine housing 12 indirectly by being attached to small brackets 961, which latter are attached to the cowling 900, which latter is attached by small cowling brackets 964 to the housing 12. The rear blower wall 960 has an outlet port 972 leading to an exhaust pipe 980.

The blower 930 has blades 990 which are shaped like the blades 320 of the rotor assembly 40.

Referring to FIG. 2, it will be seen that attached to the blower 930 is a circumferential flange 1000 on which are attached blades 1008, which latter are designed to cooperate with the cowling 900 so as to draw in cooling air in the direction of arrows 1120 past brackets 961 and be delivered into the space 902 for cooling.

In addition to what we have shown, it may be that the glow plugs 130 may be replaced for some uses by spark plugs and it may be that neither one is used when there is sufficiently high compression, such as in some diesel engines.

At a time when the seal 70, which is in FIG. 1 in the left side, has moved beyond the exhaust port CE in the upper left, then air can flow freely through the air port 120 at C to cool the space between the rotor and the housing 12 while exhausting at 230 at exhaust port CE.

The exhaust conduits 240 are directed at the exhaust blower blades 990 at such angles as to cause the movement of exhaust gas to urge the exhaust rotor 930 to rotate in the same direction as the crank shaft for conserving the exhaust gas forces for a useful purpose. By removing the key 2032 that attaches the hub 2034 of the blower 930 to the crank shaft 50, the blower 930 can be caused to turn freely and independently of the crank shaft, in which case, the exhaust gases along can be used to rotate the blower 930 and thereby power the fan blades 1008 for cooling.

It is important that terminal end of the side 161 of each power valve 100 which is closest to the axis 60, that is, the terminal end of the side 161 which is farthest from the valve hinge pin 104, extend inwardly toward the axis 60 more than the rest of the side 161, and that, in general, the side 161 be shaped cooperatively to the shape of the exterior of the rotor at its protrusion 76 so that all thrust against the power valves by the rotor 40 is exerted at the terminal end of a power valve on its side 161 portion which is farthest from the hinge pin 104. This is true of all power valves. One of the ways the structure just described can be accomplished is by having the curvature of the side 161 somewhat more concave than the curvature of the sidewall 80 of the rotor cavity 30.

Referring to FIG. 2 and FIG. 4, three different levers 2000 are shown in FIG. 4 which are for the purpose of assuring that respective power valves 100 open up at desired times. Each lever 2000 is fixed to a hinge pin portion 104, as best seen in FIG. 2, the latter is itself fixed to the respective power valve 100 so that movements of a lever 2000 will cause rotation of the hinge pin 104 and of the respective power valve 100, all with respect to the housing 12.

The outwardly extending cam portions 2010 of the first downstream rotating assembly 400 have a gradual incline on their rearward sides but have a sharp incline at 2006 on their forward sides terminating into recesses 2008. When a outwardly protruding cam portion 2010 passes under a transverse portion 2004, the respective power valve 100 will be caused to move outwardly of the respective recess 90 and toward the drive shaft for opening the respective power valve.

As seen in FIG. 1, the power valves 100 are so shaped and positioned with respect to the rotor assembly 38 that movements of the power valves into the recesses which latter movements are resultant from pressure from the rotor assembly 38 cause the recess sides of each power valve to reduce the volume of the space between the recess facing side 2050 of the respective power valve 100 and those wall portions of the respective recess 90, which latter portions are disposed inwardly of the respective recess from the recess facing side 2050 of the respective valve, such volume reduction being by a certain substantial amount, the amount being at least 20%, but, more preferably, at least 50%, and, still more preferably, at least 75%. (All as can be seen in looking at the top of FIG. 1 and imagining the power valve 100 as being inwardly of its recess 90 to the maximum, whereby the power valve 100 would all, or substantially fill that outer valve receiving portion 2060 of the recess 90 which is outwardly of the respective sub-recess of firing chamber 112. Those ends of the valves 100 which are farthest from the respective ends which are hinged by respective hinge pins 104 define free ends 107 of each valve. The valves 100 each have a rotor facing side generally indicated at 2070 which is closer to the rotor axis 60 at the free end 107 of the valve 100 (at times during rotor rotation when the respective valve 100 begins to close its recess than at times when the respective valve 100 is farther into its recess).

The rotor facing side 2070 of each valve has a rotor assembly engaging surface 2070, which latter can be continuous with and identical to the surface generally indicated at 2070. The rotor engaging surface 2070 is inclined gradually towards the rotor axis 60 to a greater extent as the free end of the respective valve is approached from its hinged end along the rotor engaging surface 2072 at times when the respective valve begins to close its recess.

The rotor assembly engaging surface 2070 of at least one of the valves 100 is concave, all valves being preferably concave.

The rotor engaging surface 2072 is preferably concave. The rotor assembly and each valve 100 is so shaped that after a protrusion assembly has passed by a given valve, then the outer surface of the following protrusion assembly will engage first some place on that one-fourth of the length of the rotor engaging surface 2072 of the respective valve 100 which is closest to the free end of that given valve and, more specifically, will engage first the free end tip 2038 of the respective surface 2072.

As best seen in FIG. 1 in the lower right-hand side, the valve 100 there can be seen to have a shape representative of all valves 100 with respect to the protrusion 77 that is closest to it. Since all of the protrusions 77 have the same shape, the relationship of curvatures seen in FIG. 1 at the lower right-hand side is typical and illustrative. This relationship is that the free end, and the tip of the free end specifically, of each valve 100 extends in toward the rotor axis a greater distance than does any other part of the rotor facing side 2070 of a valve. In addition, the curvature of each rotor-facing side 2070 of each valve is concave and is shaped so that a compression force forcing a valve 100 away from the axis 60 is exerted only on the tip of the free end of the valve 100 and only enough force from the rotor is exerted on the remainder of the rotor engaging surface 2072 as to cause the seal 70 to maintain a sealing relationship therewith all along the rotor facing side 2070 and all along the rotor assembly engaging surface 2072 as each seal 70 poasses each valve.

For this reason, it is desirable that the entire rotor facing side 2070 be engaged by part of the rotor so that the rotor engaging surface 2072 and the rotor facing side 2070 are preferably equal in length and identical in shape.

The rotary engine of this invention also comprises a first turbo-fan 312 mounted on and rotating with the drive shaft 50 and disposed in the air channel means 310 and throwing air at least partially along the axis 60 in one direction. Stator blades shown at 552 are mounted on the housing 12 so that they are stationary and downstream in the air channel means 310 from the first turbo-fan 312 and are positioned to direct air flow more longitudinally of the axis 60 than is its direction of flow as it leaves the first turbo-fan 312. A second turbo-fan 450 is mounted on and rotates with the drive shaft 50 and is disposed downstream of the stator blades 552 and directs air downstream.

A centrifugal turbo-fan 610 is provided and is mounted on and driven by the drive shaft and is disposed downstream from the second turbo-fan 450, the centrifugal turbo-fan 610 throwing air generally outwardly away from the axis 60.

The fan housing surrounding the centrifugal turbo-fan 610 directs air flow from the centrifugal turbo-fan 610 generally in a direction at least partially reverse to the flow of air from the first turbo-fan 312.

A second set of stator blades 650 is mounted on the housing between the second turbo-fan 450 and the centrifugal turbo-fan 610 in a stationary manner for directing the flow of air downstream in the channel means 310 more parallel to the axis 60 than is the travel direction of air when it leaves the second turbo-fan 450.

I claim:

1. A rotary engine comprising a housing having a rotor cavity having sidewall surfaces lying approximately on a cylindrical configuration, a drive shaft rotatably mounted on said housing for rotation about the axis of said configuration, a power rotor assembly having a rotor attached to said drive shaft and rotating within said configuration, said housing having a plurality of power valve recesses disposed extending outwardly from said axis into said sidewall, a plurality of power valve assemblies each having a power valve, said power valves each having one end hinged to said housing for swinging about a straight valve hinge line parallel to said sxis, said power valve assemblies being disposed one at each of said power valve recesses, each power valve assembly closing the entrance to its respective power valve recess to compress gases in its recess as the other end of each power valve moves away from said axis, firing chambers each disposed in communication with a certain portion of one of said power valve recesses which certain portion is farthest outward from said axis, each power valve recess and each firing chamber comprising a recess assembly, fuel and air supply means delivering fuel and air to said recess assemblies at times when the respective power valves are closing their recesses, said fuel and air delivery means delivering fuel and air to said recess assemblies in quantity for providing combustible mixtures, said fuel and air delivery to said valves being intermittent and sequential and following the closing of each respective recess assembly by its respective power valve, said rotor assembly having a surface with protrusion assemblies thereon extending outwardly from said axis, as said rotor assembly turns said protrusion assemblies sequentially pressing said power valves outwardly away from said axis by engaging the axis sides of said power valves whereby outward movement of each of said power valves causes gas compression in the respective power valve recess and in the respective firing chamber, ignition of gases in said firing chambers forcing said other ends of said power valves toward said axis sufficiently to cause said power valves to sequentially open the respective power valve recesses to said rotor cavity allowing the force of explosions in said firing chambers to engage the rearward sides of said rotor protrusion assemblies forcing forward rotation of said rotor assembly, said rotor assembly being so shaped as to permit said power valves to move toward said axis at times for permitting escape of explosion force into said cavity as described, exhaust means comprising exhaust ports in the walls of said rotor cavity disposed between each two adjacent power valves and exhausting combustion gases from said rotor cavity after a respective rotor protrusion assembly has passed the respective exhaust port, said power valves being so shaped and positioned with respect to said rotor assembly that movements of the power valves into said recesses which are resultant from pressure from said rotor assembly cause the recess side of each power valve to reduce the volume of the space between the recessfacing side of the respective power valve and those wall portions of the respective recess which latter portions are disposed inwardly of the respective recess from the recessfacing side of the respective power valve, such volume reduction being by a certain substantial amount, said amount being at least 20%.

2. The rotary engine of claim 1 further comprising said fuel and air delivery means comprising air passages through said housing and air inlet ports disposed one on the wall of each of said recess assemblies, and an air valving means rotatably mounted on said drive shaft and having air openings therethrough permitting air to pass through said passages sequentially to said air ports only at times when said air openings are in registry with said passages.

3. The rotary engine of claim 2 further comprising said air valving means having a plurality of spaced cam surface means extending from its periphery, valve opening assemblies for opening power valves to insure that they do not stick to said housing and engaging and operably correlated with said cam surface means and attached to said power valve assemblies whereby when as said rotor rotates, said cam surface means engage said valve opening assemblies respectively causing said power valves to sequentially open.

4. The rotary engine of claim 3 in which those parts of said rotating air valving means which are passing any one of said valve opening assemblies at any time are of constant radius during the air intake phase of power rotor rotation and decrease as respective power valve starts to close for a compression phase and increase again as the respective firing chamber is fired, the shape of the periphery of said air valving means being correlated to the shape of said power rotor to make possible the timing described herein.

5. The rotary engine of claim 1 further comprising said housing having air channel means therethrough through which air that has passed through said rotor is delivered to said air passages.

6. The rotary engine of claim 5 further comprising: air blowing means in said housing air channel means and powered by said drive shaft and forcing air into said air passages.

7. The rotary engine of claim 1 further comprising: an exhaust blower having a rotating portion drivably connected to said drive shaft, said exhaust blower having a housing means, exhaust conduits in communication with said exhaust ports and exhaust blower housing meeans, said exhaust blower also having an exhaust outlet means, said exhaust blower being urged to rotate by the force thereagainst of exhaust gases from said exhaust conduits, cooling fan means on the exterior of said housing and blowing air across the outside of said engine housing, said cooling fan means constantly being driven by being connected to said exhaust blower driving operation.

8. The rotary engine of claim 7 in which a cowling is mounted on said housing and spaced from said housing and catches cooling air from said cooling fan means and directs it against said housing.

9. The rotary engine of claim 1 in which those surfaces of said power valves which are closest to said drive shaft are cooperatively shaped with respect to the exterior of said rotor so that all force exerted against said power valves by said rotor engages each of said power valves only near those ends thereof which are farthest from the hinged ends thereof respectively.

10. The rotary engine of claim 1 having said volume reduction amount being at least 50%.

11. The rotary engine of claim 1 having said volume reduction amount being at least 75%.

12. The rotary engine of claim 1 having those ends of said valves which are farthest from the respecctive hinged ends thereof defining free ends thereof, said valves each having a rotor-facing side which is closer to said axis at the free end of the respective valve at times during rotor rotation when the respective valve begins to close its recess than at times when the respective valve is farther into its recess.

13. The rotary engine of claim 1 having those ends of said valves which are farthest from the respective hinged ends thereof defining free ends thereof, the rotor facing side of each of said valves having a rotor assembly engaging surface, said latter surface being inclined gradually towards said rotor axis to a greater extend as the free end of the respective valve is approached from its free end along said rotor engaging surface at those times during rotor rotation when the respective valve begins to close its recess.

14. The rotary engine of claim 13 having said rotor assembly engaging surfaces of at least one of said valves being concave.

15. The rotary engine of claim 1 having said rotor assembly and each of said valves being so shaped that after a protrusion assembly has passed by a given valve, the outer surface of the next following protrusion assembly will engage first somewhere along that one quarter of the length of said given valve that is closest to the free end thereof.

16. The rotary engine of claim 1 in which said valves and recesses are each respectively three in number and in which said rotary protrusions are two in total number.

17. The rotary engine of claim 5 further comprising a first turbo-fan mounted on and rotating with said drive shaft and disposed in said air channel means and throwing air at least partially along said axis in one direction, stator blades mounted on said housing so that they are stationary and downstream in said air channel meeans from said first turbo-fan and positioned to direct air flow more longitudinally of said axis than is its direction of flow as it leaves said first turbo-fan, a second turbo-fan mounted on the rotating with said drive shaft and disposed downstream of said stator blades and directing air downstream.

18. The combination of claim 17 in which a centrifugal turbo-fan is mounted on and driven by said drive shaft and is disposed downstream from said second turbo-fan, said centrifugal turbo-fan throwing air generally outwardly away from said axis.

19. The combination of claim 17 in which a second set of stator blades is mounted on said housing between said second turbo-fan and said centrifugal turbo-fan in a stationary manner for directing the flow of air downstream in said channel means more parallel to said axis than is the travel direction of air when it leaves said second turbo-fan.

20. The rotary engine of claim 5 further comprising a first tubo-fan mounted on and rotating with said drive shaft and disposed in said air channel means and throwing air at least partially along said axis in one direction, a centrifugal turbo-fan is mounted on the driven by said drive shaft and is disposed downstream from said first turbo-fan, a fan housing surrounding said centrifugal turbo-fan and directing air flow from said centrifugal turbo-fan generally in a direction at least partially reverse to the flow of air from said first turbo-fan.

* * * * *